United States Patent [19]

Davidson

[11] Patent Number: 5,013,244

[45] Date of Patent: May 7, 1991

[54] COLORIMETRIC SCALE FOR CORRELATING A SHADE TWO BLENDED COLORS WITH THE SUN PROTECTION FACTOR OF A SUN SCREENING AGENT

[76] Inventor: Jeffrey L. Davidson, 3735 Bagley Ave., Los Angeles, Calif. 90034

[21] Appl. No.: 436,655

[22] Filed: Nov. 15, 1989

[51] Int. Cl.$^5$ .............................................. G09B 29/00

[52] U.S. Cl. ........................................ 434/81; 434/100

[58] Field of Search ..................... 434/98, 100, 99, 81; 222/59

[56] References Cited

U.S. PATENT DOCUMENTS

| | | | |
|---|---|---|---|
| 3,501,852 | 3/1970 | Hartel et al. | 434/98 |
| 3,609,886 | 10/1971 | Vien | 434/99 |
| 3,815,265 | 6/1974 | DePauw | 434/103 |
| 3,856,136 | 12/1974 | Governale | 434/98 X |
| 4,009,527 | 3/1977 | Scott et al. | 434/98 |
| 4,523,852 | 6/1985 | Bauer | 356/421 |
| 4,561,850 | 12/1985 | Fabbri et al. | 434/98 |
| 4,597,997 | 7/1986 | Weill | 434/84 X |
| 4,629,428 | 12/1986 | Phillips | 434/98 |
| 4,643,974 | 2/1987 | Berretti et al. | 434/98 X |
| 4,665,394 | 5/1987 | Coles et al. | 434/98 X |
| 4,692,481 | 9/1987 | Kelly | 356/402 X |
| 4,749,865 | 6/1988 | Scheller | 250/338.1 |
| 4,761,137 | 8/1988 | Taylor et al. | 434/99 |
| 4,818,491 | 4/1989 | Fariss | 116/207 X |
| 4,893,729 | 1/1990 | Iggulden et al. | 222/212 X |
| 4,909,632 | 3/1990 | McFarland | 434/99 X |

*Primary Examiner*—Robert Bahr
*Assistant Examiner*—Rachel M. Healey
*Attorney, Agent, or Firm*—W. Edward Johansen

[57] ABSTRACT

A kit includes a first dispenser, a second dispenser and a colorimetric scale. The first dispenser stores and dispenses a first sun screening agent of a low sun protection factor of a first color. The second dispenser stores and dispenses a second sun screening agent of a high sun protection factor of a second color. The first sun screening agent and the second sun screening agent may be mixed together in order to obtain sun screening agent of intermediate sun protection factor and the first and second colors are blended. The colorimetric scale includes a plurality of representations of shades of blends of the first and second colors and a plurality of designations of sun protection factors. Each designation of sun protection factors has been calibrated to correlate with one of the representations of shades of the blended first and second colors in order to determine the sun protection factor of the intermediate sun screening agent.

1 Claim, 1 Drawing Sheet

COLORIMETRIC SCALE FOR CORRELATING A SHADE TWO BLENDED COLORS WITH THE SUN PROTECTION FACTOR OF A SUN SCREENING AGENT

BACKGROUND OF THE INVENTION

1. Field of the Invention

The present invention relates to dispensers for dispensing sun screening agents and more particularly to a dual compartment dispenser for dispensing a sun screening agent of a low sun protection factor and a sun screening agent of a high sun protection factor which may be mixed together in order to obtain a sun screening agent of intermediate sun protection factor.

2. Description of the Prior Art

U.S. Pat. No. 4,818,491, entitled Suntanning Gauge, issued to James D. Fariss on Apr. 4, 1989, teaches a grading system which called the "sun protection factor" (SPF) number. The SPF number is used to quantify the degree of protection afford by a given sun screening agent and is the ratio of the dose of ultra-violet radiation which is required to produce minimal pinkness twenty four hours after exposure on skin which is covered by the sun screen to the dose of ultra-violet radiation on unprotected skin. SPF numbers are determined in the laboratory. The actual protection factor which a given sun screening agent provides in daily use varies with the user's complexion, frequency and thickness of application, perspiration and exposure to water.

U.S. Pat. No. 4,893,729, entitled Selectable Mixing Bottle, issued to Jerry R. Iggulden and Donald A. Streck on Jan. 16, 1990, teaches a bottle for holding, mixing, and dispensing an adjustable SPF mixture of a lotion and a liquid containing a sunscreening agent. There is a plastic bottle containing first and second compartments for containing, respectively, the lotion and the sunscreen agent-containing liquid and having a cylindrical neck at the top thereof containing a first bore therethrough communicating with the first compartment and a second bore therethrough communicating with the second compartment. The first bore is concentrically disposed in the neck and sized for passing known quantities of the lotion with the second bore being peripherally disposed with respect to the first bore and sized to add a quantity of the sunscreen agent which will impart a pre-selected maximum SPF value to dispensed quantities of mixtures of the lotion and the sunscreen agent. A selector dial is rotatably mounted on the neck, having a central cap portion covering the neck, a central bore through a top member thereof concentrically disposed over the first bore, and a plurality of various diameter metering bores disposed peripherally through the top member concentrically disposed to pass over the second bore as the selector dial is rotated on the neck with indicia disposed for indicating the SPF value of the metering bores. A mixing chamber member is disposed over the central cap portion and has an internal mixing chamber communicating with the first and second bores and the central and metering bores on a bottom end thereof and a third bore therethrough at a top end thereof for the egress of the mixed lotion and sunscreen agent-containing liquid.

U.S. Pat. No. D-280,599, entitled Twin Compartment Bottle, issued to Richard D. Green on Sept. 17, 1985, teaches a twin compartment bottle which are used to separately store and dispense two liquids, such as shampoo and conditioner. U.S. Pat. No. D-290,225, entitled Multiple Chamber Dispenser, issued to Bradley C. Carlson on June 9, 1987, teaches a multiple chamber dispenser which are used to separately store and dispense two or more liquids, such as shampoo and conditioner. U.S. Pat. No. D-263,118, entitled Twin Compartment Bottle, issued to Richard L. Weckman on Feb. 23, 1982, teaches a twin compartment bottle which are used to separately store and dispense two liquids, such as shampoo and conditioner.

U.S. Pat. No. 3,918,612, entitled Solution of Sun Screening Agent and Insect Repellent with Dispensing Bottle, issued to Anthony Voulgaris on Nov. 11, 1975, teaches a dispensing bottle with a first individual chamber, a second individual chamber and a dispensing head. A sun screening agent solution is contained in the first individual chamber. An insect repellent solution is contained in the second individual chamber. The sun screening agent solution and the insect repellent solution are stored separately. The dispensing head is affixed to the dispensing bottle and allows direct application of either the sun screening agent solution or the insect repellent solution as an individual solution to a person's skin or as a mixture of the sun screening agent solution and the insect repellent solution by means of a mixing assembly which is contained within the dispensing head. The two individual solutions are mixed together. U.S. Pat. No. 4,810,489, entitled High Oil Phase Pharmaceutical Vehicles and Sunscreen Compositions having Waterproof Sun Protection Factors, issued to Terrence J. Murray, Bhiku G. Patel and Richard O. Muhlhauser on Mar. 7, 1989, teaches sun screening agent which have waterproof sun protection factors. U.S. Pat. No. 3,529,055, entitled Suntan Composition and Method Containing Alkali Soluble Polymeric Sun Screening Agents, issued to Martin Skoultchi, Joseph Fertig and Albert I. Goldberg on Sept. 15, 1970, teaches sun screening agents. U.S. Pat. No. 3,590,118, entitled Long Lasting Insect Repellent Film for Skin and Other Substrates, issued to James A. Conrady, Charles H. Stockman on June 29, 1971, teaches an insect repellent for skin.

U.S. Pat. No. 4,818,491 also teaches a suntanning gauge which has a plurality of ultra-violet light absorbing lenses of varying thicknesses affixed to a convenient-to-carry base. The suntanning gauge aids in determining what sun screening agent to use. U.S. Pat. No. 4,749,865, entitled Apparatus for Determining an Optimum Sunscreen Factor at Any Given Time, issued to Klaus Scheller on June 7, 1988, teaches an apparatus which determines an optimum sun protection factor at any given time.

U.S. Pat. No. 4,768,688, entitled Suntan Lotion Bracelet, issued to Roy M. Harrigan on Sept. 6, 1988, teaches a suntan lotion bracelet which is formed from a tubular body which is configured in the shape of a ring. The tubular body forms a chamber which receives a liquid suntan lotion.

U.S. Pat. No. 4,759,652, entitled Lotion Applicator System, issued to Tate B. Ulrich on July 26, 1988, teaches a lotion applicator system which applies lotions and oils to various parts of the human body. The lotion applicator system includes a container and a continuous lotion-carrying strip therein. The free end of the lotion-carrying strip is accessible through an aperture in the container. Separatable, disposable portions of the lotion-carrying strip can be removed from the container and used to apply lotion.

U.S. Pat. No. 4,196,808, entitled Closure Interlock and Packaging Apparatus, issued to John Pardo on Apr. 8, 1980, teaches a dispensing container which has a sequential closure interlock device and multiple product compartments.

U.S. Pat. No. 4,736,876, entitled Portable Dispenser, issued to Carol A. Kriss on Apr. 12, 1988, teaches a portable dispenser which includes either a linear array of flexible containers or a series of packets. The portable dispenser may be worn about the wrist. Each flexible container or packet is suitable for holding and dispensing either a liquid or a semi-liquid substance.

U.S. Pat. No. 3,463,302, entitled Packaged Disposable Lotion Filled Applicator, issued to Pearl M. Preston on Aug. 26, 1969, teaches a disposable device which is in the form of a packaged lotion or oil filled applicator and which has a circular lotion or oil contained sponge which is made of foam rubber with an elongated handle attached thereto in order to easily apply either the lotion or the oil to various part of the body.

U.S. Pat. No. 4,571,106, entitled Sun Lotion Applicator, issued to Richard Scuderi on Feb. 18, 1986, teaches a spherical ball applicator which applies lotion for protection from the rays of the sun.

U.S. Pat. No. 3,815,265, entitled Color Blending Set and Paint Mixing Tray, issued to Robert C. DePauw on June 11, 1974, teaches a color blending set which includes a color mixing tray with mixing wells and containers of paints of mixing hues in the mixing wells. The color blending set also includes a guide with a spectrum chart representing the mixing wells of the mixing tray together with indicia indicating instruction for mixing of the red, yellow and blue to create secondary colors.

U.S. Pat. No, 4,597,997, entitled Foam Paint Set, issued to Linda Weill on July 1, 1986, teaches a foam paint set which includes three aerosol applicators each of which includes one of three paints corresponding to the three primary colors. The three paints are mixed to create secondary colors in appropriate portions of the three primary colors.

U.S. Pat. No. 3,939,188, entitled Color Sorting of Irradiated Materials and a Calibrated Color Comparison Array, issued to Baldwin Sawyer on Feb. 3, 1976, teaches a method of isolating quartz, quartzite, glass or silicate materials which have selected aluminum contents. The quartz, quartzite, glass or silicate materials or fractions of such materials are ionized so that there is a distinctive color center developed and the color center is compared to the known color center of the same material with a uniform and known aluminum content.

U.S. Pat. No. 4,009,527, entitled Coordinated Color Chart System and Method of Producing Same, issued to Camilla Ann Scott and Elizabeth L. Zimmerman on Mar. 1, 1977, teaches a color cube in which the three primary colorants are arranged along three mutually intersecting edges. Each face of the color cube constitutes a color chart of two of the three primary colorants.

U.S. Pat. No. 4,588,696, entitled Pellet Process for Detection of Formaldehyde and/or Glutaraldehyde, issued to Cleamond D. Eskelson on May 13, 1986, teaches a kit which includes three tablets for use in a process of testing a test solution for the amount of formaldehyde and/or glutaraldehyde in a sensitive, rapid, and simple manner. The kit also includes a chart the colors of which are compared to the yellow color which the reaction of the tablets with the test solution produced.

U.S. Pat. No. 3,501,852, entitled Color Scales for Analytical and Diagnostic Purposes, issue to Arnold Hartel and Hermann Lang on Mar. 24, 1970, teaches a printed color which evaluates colorimetric reaction. The scale is a continuous spectrum in the applicable range printed by a half-tone four-color technique and is calibrated after printing.

U.S. Pat. No. 4,523,852, entitled Comparison Reference Standard and Method for Using Same, issued to Robert Bauer on June 18, 1985, teaches a method for visibly comparing the results of colorimetric analytical test to a color reference standard. U.S. Pat. No. 4,692,481, entitled Process for Matching Color of Paint to a Colored Surface, issued to Renee J. Kelley on Sept. 8, 1987, teaches a process for matching the color characteristic of a paint.

SUMMARY OF THE INVENTION

In view of the foregoing factors and conditions which are characteristic of the prior art it is the primary object of the present invention to provide a dual compartment dispenser which dispenses a first sun screening agent of a low sun protection factor and a second sun screening agent of a high sun protection factor.

It is another object of the present invention to mix the first sun screening agent of a first color with the second sun screening agent of a second color and in order to obtain a sun screening agent of intermediate sun protection factor of a shade of the blended first and second colors.

It is still another object of the present invention to provide a colorimetric scale for correlating the shade of the blended first and second colors of the mixture of the first and second sun screening agents in order to determine the sun protection factor of the sun screening agent.

In accordance with the preferred embodiment of the present invention a kit including a first dispenser, a second dispenser and a colorimetric scale is described. The first dispenser stores and dispenses a first sun screening agent of a low sun protection factor of a first color. The second dispenser stores and dispenses a second sun screening agent of a high sun protection factor of a second color. The first sun screening agent and the second sun screening agent may be mixed together in order to obtain sun screening agent of intermediate sun protection factor and the first and second colors are blended. The colorimetric scale includes a plurality of representions of shades of blends of the first and second colors and a plurality of designations of sun protection factors. Each designation of sun protection factors has been calibrated to correlate with one of the representations of shades of the blended first and second colors in order to determine the sun protection factor of the intermediate sun screening agent.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
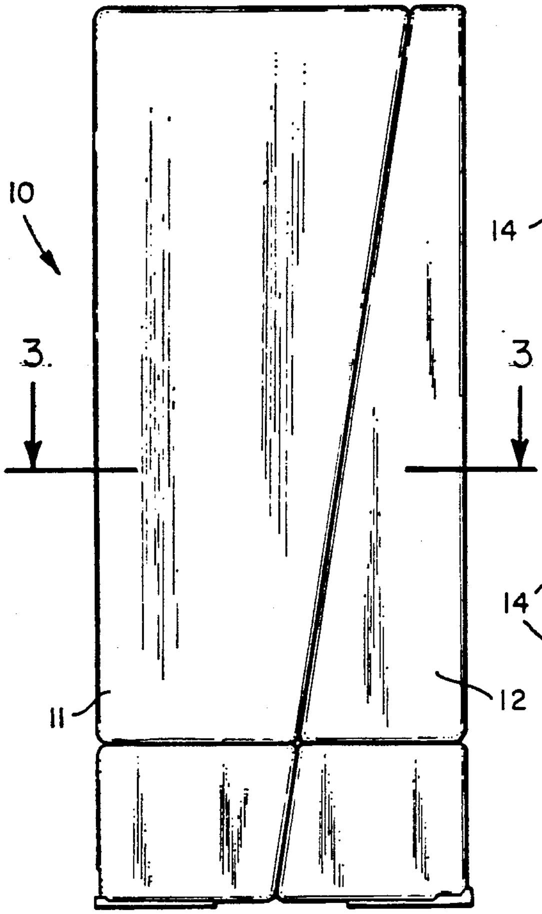
FIG. 1 is a front elevational view of a dual compartment dispenser which includes a first compartment and a second compartment and which has been made in accordance with the principles of the present invention.
Figure 2:
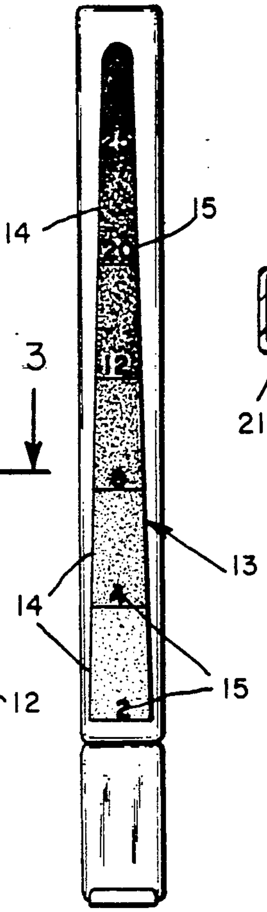
FIG. 2 is side elevation view of the dual compartment dispenser of FIG. 1 which also includes a colormetric scale which includes representions of shades of blends of a first color and a second color and designations of sun protection factors each of which has been calibrated to correlate with one of the representions of shades of the blended first and second colors.

In order to best understand the present invention it is necessary to refer to the following description of its preferred embodiment in conjunction with the accompanying drawing. Referring to FIG. 1 in conjunction with FIG. 2 a dual compartment dispenser 10 includes a first compartment 11, a second compartment 12 which is mechanically coupled to the first compartment 11 and a colorimetric scale 13. The colorimetric scale 13 includes representions 14 of shades of blends of a first color 21 and a second color 22 and designations 15 of sun protection factors each of which has been calibrated to correlate with one of the representions 14 of the shades of the blended first and second colors 21 and 22.

Figure 3:
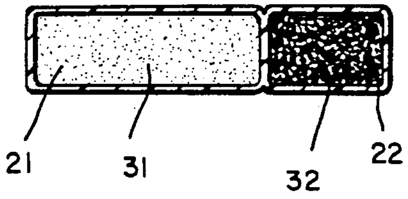
FIG. 3 is a cross-sectional view of the dual compartment dispenser of FIG. 1 taken along the line 3—3 of FIG. 1 having a first sun screening agent of a low sun protection factor and the first color stored in the first compartment and a second sun screening agent of a high sun protection factor and the second color.

Referring to FIG. 1 in conjunction with FIG. 3 the first and second compartments 11 and 12 store and dispense a first sun screening agent 31 of a low sun protection factor and a second sun screening agent 32 of a high sun protection factor, respectively. The first and second sun screening agents 31 and 32 are of the first color 21 and a second color 22, respectively. Any other first color 21 and any other second color 22 to achieve shades of a third color. The first and second colors 21 and 22 are easily obtained from color charts such as the coordinated color chart of U. S. Pat. No. 4,009,527. The preferred first and second colors 21 and 22 are F.D.& C. yellow #5 and F.D.& C. red #22, respectively, to achieve shades of peach. Other preferred first and second colors 21 and 22 are other yellows and other reds to achieve shades of orange, yellows and blue to achieve shades of green.

Figure 4:
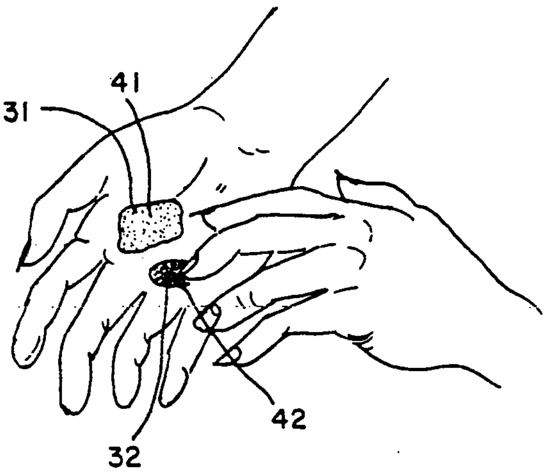
FIG. 4 is a schematic drawing of a pair of hands onto one of which a first amount of the first sun screening agent and a second amount of the second sun screening agent are placed and mixed together with the fingers of the other hand.
Figure 5:
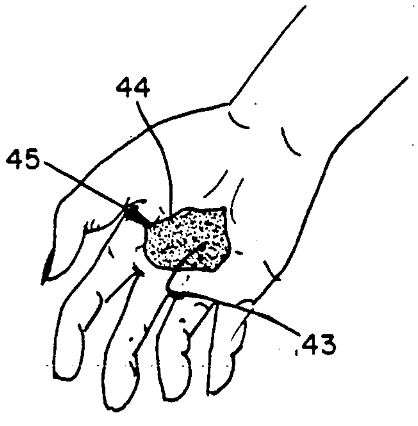
FIG. 5 is a schematic drawing of one of the hands of FIG. 4 on which the first and second sun screening agents have been mixed together to obtain a sun screening agent of an intermediate sun protection factor which may be determined by using the colorimetric scale.

Referring to FIG. 4 in conjunction with FIG. 5 a first amount 41 of the first sun screening agent 31 and a second amount 42 of the second sun screening agent 32 may be mixed together. The mixture 43 of the first and second amounts 41 and 42 of the first and second sun screening agents 31 and 32, respectively, produces a sun screening agent 45 of intermediate sun protection factor. A shade 44 of the blended first and second colors 21 and 22 is produced in the mixture 43 of the first and second amounts 41 and 42 of the first and second sun screening agents 31 and 32, respectively. The colorimetric scale 13 correlates one of the representations 14 of the shades of the blended first and second colors 21 and 22 with the shade 44 of the blended first and second colors 21 and 22 of the sun screening agents in order to determine the sun protection factor of the sun screening agent 45. The ratio of the first color 21 to the second color 22 correlates with the ratio of the first and second amounts 41 and 42 of the first and second sun screening agents 31 and 32, respectively. The amount of sun screening ingredients in a sun screening agent determines its sun protection factor. The ratio of the first and second amounts 41 and 42 of the first and second sun screening agents 31 and 32, respectively, correlates with the sun protection factor of the sun screening agent.

From the foregoing it can be seen that a dual compartment dispenser for dispensing a sun screening agent of a low sun protection factor and a first color and a sun screening agent of a high sun protection factor and a second color which may be mixed together in order to obtain a sun screening agent of intermediate sun protection factor and a colorimetric scale for correlating a shade of the blended first and second colors with the sun protection factor of the sun screening agent have been described. It should be noted that the sketches are not drawn to scale and that distance of and between the figures are not to be considered significant.

What is claimed is:

1. A kit comprising:

a. a first dispenser which stores and dispenses a first sun screening agent of a low sun protection factor of a first color;

b. a second dispenser which stores and dispenses a second sun screening agent of a high sun protection factor of a second color whereby said first sun screening agent and said second sun screening agent may be mixed together in order to obtain sun screening agent of intermediate sun protection factor so that the first and second colors are blended; and c. a colorimetric scale having a plurality of representions of shades of blends of the first and second colors and a plurality of designations of sun protection factors each of which has been calibrated to correlate with one of said representations of shades of the blended first and second colors in order determine the sun protection factor of the intermediate sun screening agent.

* * * * *